United States Patent
Nanda et al.

(10) Patent No.: US 10,760,977 B2
(45) Date of Patent: *Sep. 1, 2020

(54) SYSTEM AND METHOD FOR DETECTING LUBRICATED BEARING CONDITION

(71) Applicant: General Electric Company, Schenectady, NY (US)

(72) Inventors: Subrat Nanda, Houston, TX (US); Douglas David Baptista de Souza, Rio de Janeiro (BR); Bruno Paes Leao, Rio de Janeiro (BR)

(73) Assignee: General Electric Company, Schenectady, NY (US)

(*) Notice: Subject to any disclaimer, the term of this patent is extended or adjusted under 35 U.S.C. 154(b) by 468 days.

This patent is subject to a terminal disclaimer.

(21) Appl. No.: 15/597,606

(22) Filed: May 17, 2017

(65) Prior Publication Data

US 2018/0334917 A1 Nov. 22, 2018

(51) Int. Cl.
| | |
|---|---|
| *F01D 17/08* | (2006.01) |
| *G01K 7/42* | (2006.01) |
| *F16C 19/52* | (2006.01) |
| *F01D 21/12* | (2006.01) |
| *G01K 3/00* | (2006.01) |

(Continued)

(52) U.S. Cl.
CPC .......... *G01K 7/425* (2013.01); *F01D 21/12* (2013.01); *F16C 19/522* (2013.01); *F16C 19/525* (2013.01); *F16C 33/667* (2013.01); *G01K 3/005* (2013.01); *F05D 2260/81* (2013.01); *F05D 2260/98* (2013.01); *F05D 2270/3032* (2013.01); *F16C 17/243* (2013.01); *F16C 2233/00* (2013.01); *F16C 2360/23* (2013.01)

(58) Field of Classification Search
None
See application file for complete search history.

(56) References Cited

U.S. PATENT DOCUMENTS

| | | | | |
|---|---|---|---|---|
| 8,855,375 | B2* | 10/2014 | Macciola | H04N 1/00251 382/112 |
| 9,997,047 | B2* | 6/2018 | Nanda | F01D 21/003 |

(Continued)

OTHER PUBLICATIONS

U.S. Appl. No. 15/284,057, filed Oct. 3, 2016, Hirdepal Singh.

*Primary Examiner* — Tung S Lau
(74) *Attorney, Agent, or Firm* — Fletcher Yoder, P.C.

(57) ABSTRACT

A monitoring system includes an analytical engine system coupled to a plurality of sensors of an engine system. The analytical engine system is configured to determine a model probability distribution based on model data, determine a distance threshold value of the model probability distribution based at least in part on a threshold percentage, determine a window probability distribution based on window data sampled from the engine system, determine a fraction of the window probability distribution that is greater than the distance threshold value, and generate a lubricant alert signal when the fraction is greater than a temperature anomaly threshold. The model data includes model temperature data and model load data. The window data includes window temperature data and window load data that is based at least in part on feedback from the plurality of sensors during operation of the engine system.

17 Claims, 3 Drawing Sheets

(51) Int. Cl.
 *F16C 33/66* (2006.01)
 *F16C 17/24* (2006.01)

(56) References Cited

U.S. PATENT DOCUMENTS

| | | | | |
|---|---|---|---|---|
| 2013/0013138 A1* | 1/2013 | Lu | ............ | B60L 3/0061 |
| | | | | 701/22 |
| 2013/0196862 A1* | 8/2013 | Rabinowitz | ............ | G16B 20/00 |
| | | | | 506/2 |
| 2014/0007657 A1 | 1/2014 | Matsubara et al. | | |
| 2014/0358414 A1* | 12/2014 | Ibrahim | ............ | G01C 21/10 |
| | | | | 701/118 |
| 2016/0036558 A1* | 2/2016 | Ibrahim | ............ | H04L 67/18 |
| | | | | 455/297 |
| 2016/0049079 A1* | 2/2016 | Ibrahim | ............ | G08G 1/005 |
| | | | | 340/944 |

\* cited by examiner

SYSTEM AND METHOD FOR DETECTING LUBRICATED BEARING CONDITION

BACKGROUND OF THE INVENTION

The subject matter disclosed herein relates to bearings, such as a system and method for detecting the condition of a lubricated bearing of a turbomachinery system.

Turbomachinery may include an apparatus such as a turbine, a compressor, or a pump. One or more components of the turbomachinery rotate about an axis. A bearing of the turbomachinery may facilitate rotation of the one or more components about the axis. Additionally, the bearing may support loads on or generated by the turbomachinery. A load on the bearing that is greater than a design capacity may increase wear on the bearing. Additionally, elements of the bearing may degrade over time, during operation of the turbomachinery, or any combination thereof. Maintenance or replacement of the bearing when the bearing has significant usable life may increase costs and decrease the efficiency of the turbomachinery. Conversely, delayed maintenance or delayed replacement of a worn bearing may increase the possibility of failure of the bearing, or increase the possibility of damage to the turbomachinery.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a monitoring system includes an analytical engine system coupled to a plurality of sensors of an engine system. The analytical engine system is configured to determine a model probability distribution based on model data, determine a distance threshold value of the model probability distribution based at least in part on a threshold percentage, determine a window probability distribution based on window data sampled from the engine system, determine a fraction of the window probability distribution that is greater than the distance threshold value, and generate a lubricant alert signal when the fraction is greater than a temperature anomaly threshold. The model data includes model temperature data and model load data. The window data includes window temperature data and window load data that is based at least in part on feedback from the plurality of sensors during operation of the engine system.

In a second embodiment, a method of operating an analytical engine system includes loading model data from a memory, determining a model probability distribution based on the model data, determining a distance threshold value of the model probability distribution based at least in part on a threshold percentage, determining a window probability distribution based on window data sampled during operation of the engine system, determining a fraction of the window probability distribution that is greater than the distance threshold value, and generating a lubricant alert signal when the fraction is greater than a temperature anomaly threshold. The model data includes model lubricant temperature data and model load data. The window data includes window temperature data and window load data that is based at least in part on feedback from the plurality of sensors during current operation of the engine system.

In a third embodiment, a non-transitory computer readable medium includes instructions configured to be executed by a processor of a control system. The instructions include instructions configured to cause the processor to load model data from a memory, determine a model probability distribution based on the model data, determine a distance threshold value of the model probability distribution based at least in part on a threshold percentage, determine a window probability distribution based on window data sampled from the engine system, determine a fraction of the window probability distribution that is greater than the distance threshold value, and generate a lubricant alert signal when the fraction is greater than a 0.5. The model data is based at least in part on sensor feedback during prior operation of an engine system, and includes model lubricant temperature data and model load data. The threshold percentage is greater than or equal to 90 percent, and the window data includes window temperature data and window load data that is based at least in part on sensor feedback during operation of the engine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Lubricated bearings may support rotating components of turbomachinery and engine systems, such as a gas turbine system. Time and use may affect the lubricant and the lubricated elements of the bearing. Through monitoring parameters associated with the lubricated bearing or turbomachinery, it is believed that the condition or health of the bearing may be determined. Changes in the loading on the bearing may affect the friction within the bearing, and increased friction within the bearing may increase the temperature of the lubricant. Monitoring the temperature of the lubricant in addition to other parameters associated with the lubricated bearing or turbomachinery may enable the construction of a robust model of the bearing condition, as discussed in detail below. Modification of the model based on current or recently acquired data from the gas turbine system may improve the accuracy of the model and facilitate tailoring of the model to the respective gas turbine system. That is, an asset-specific model may be updated during operation of the asset to improve the model, such as to base the model on what is considered normal operating conditions for the asset, which may be different operating conditions than those of another asset in the fleet.

Figure 1:
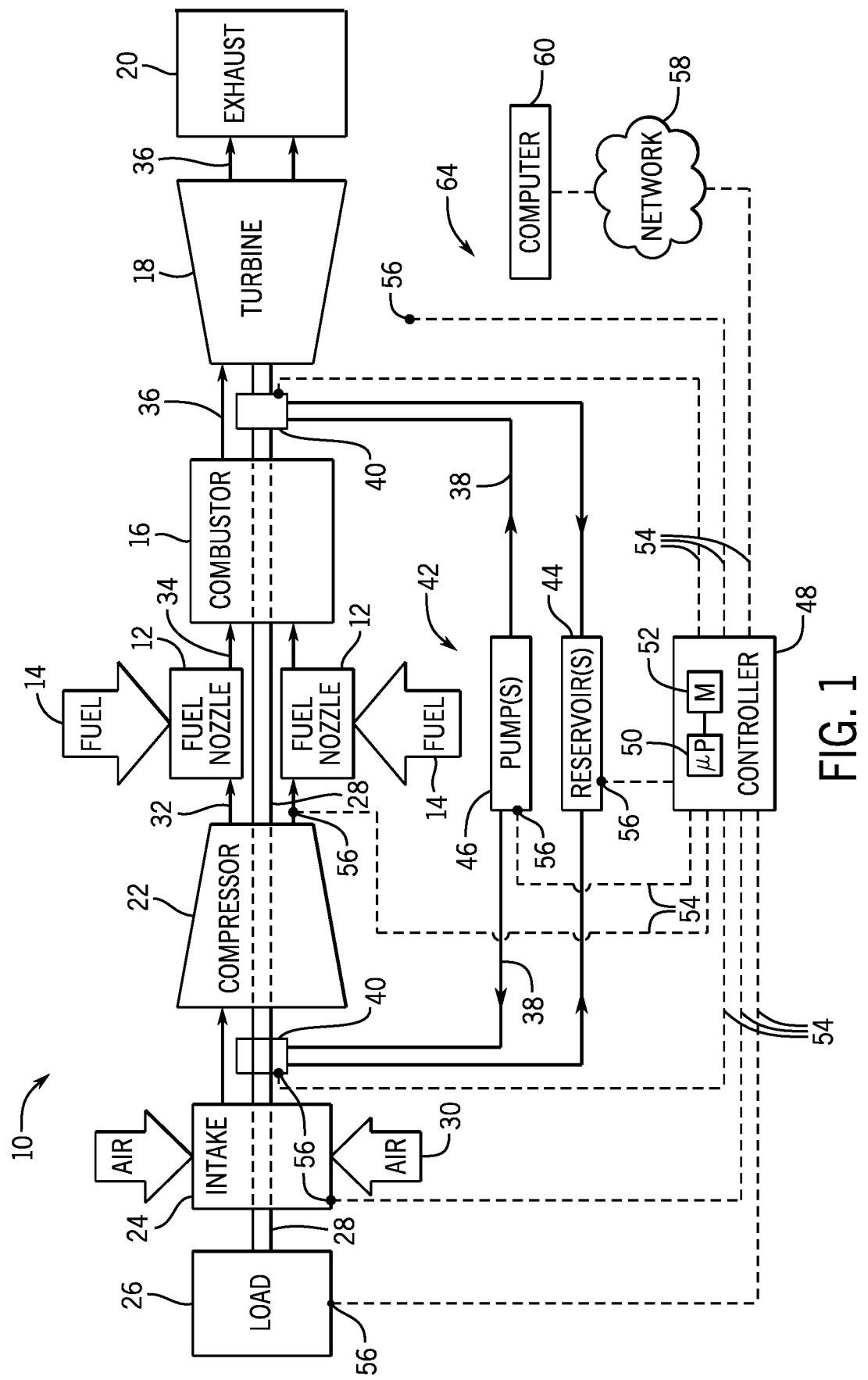
FIG. 1 is an embodiment of a gas turbine turbomachinery system with an analytical engine system.

Turning now to the drawings and referring first to FIG. 1, a block diagram of an embodiment of an engine system 10 (e.g., gas turbine system) is illustrated. The diagram includes fuel nozzles 12, fuel 14, and a combustor 16. As depicted, the fuel 14 (e.g., a liquid fuel and/or gas fuel, such as natural gas) is routed to the turbine system 10 through the fuel nozzle 12 into the combustor 16. The combustor 16 ignites and combusts an air-fuel mixture 34, and then passes hot pressurized exhaust gas 36 into a turbine 18. The exhaust gas 36 passes through turbine blades of a turbine rotor in the turbine 18, thereby driving the turbine 18 to rotate. The coupling between blades in the turbine 18 and a shaft 28 will cause the rotation of the shaft 28, which is also coupled to several components (e.g., compressor 22, load 26) throughout the turbine system 10. It may be appreciated that while only one shaft 28 is discussed below, the gas turbine system 10 may have multiple shafts 28 (e.g., coaxial shafts) driven by rotation of the blades of the turbine 18. Eventually, the expanded exhaust gases 36 of the combustion process may exit the turbine system 10 via an exhaust outlet 20.

In an embodiment of the turbine system 10, compressor vanes or blades are included as components of the compressor 22. Blades within the compressor 22 may be coupled to the shaft 28, and will rotate as the shaft 28 is driven to rotate by the turbine 18. The compressor 22 may intake air 30 to the turbine system 10 via an air intake 24. Further, the shaft 28 may be coupled to the load 26, which may be powered via rotation of the shaft 28. As appreciated, the load 26 may be any suitable device that may generate power via the rotational output of the turbine system 10, such as a power generation plant or an external mechanical load. For example, the load 26 may include an electrical generator, a propeller of an airplane, and so forth. The air intake 24 draws air 30 into the turbine system 10 via a suitable mechanism, such as a cold air intake, for subsequent mixture of the air 30 with the fuel 14 via the fuel nozzles 12. Air 30 taken in by the turbine system 10 may be fed and compressed into pressurized air 32 by rotating blades within the compressor 22. The pressurized air 32 may then be fed into the one or more fuel nozzles 12. The fuel nozzles 12 may then mix the pressurized air 32 and fuel 14, to produce a suitable air-fuel mixture 34 for combustion, e.g., a combustion that causes the fuel 14 to more completely burn, so as not to waste fuel 14 or cause excess emissions in the exhaust gases 36. Again, the turbine 18 is driven by the exhaust gases 36.

One or more bearings 40 of the gas turbine system 10 support the shaft 28. The one or more bearings 40 may provide radial support for the shaft 28, axial support for the shaft 28, or any combination thereof. In some embodiments, one or more of the bearings 40 is a lubricated bearing. A bearing system 42 may supply a lubricant 38 (e.g., oil, grease, gas) from a reservoir 44 to the bearing 40 via one or more pumps 46. The reservoir 44 may include, but is not limited to one or more tanks, one or more sumps, or any combination thereof. In some embodiments, a controller 48 may control the one or more pumps 46 of the bearing system 42. In some embodiments, the controller 48 of the bearing system 42 controls or monitors components of the gas turbine system 10. That is, the controller 48 may be a dedicated controller of the bearing system 42, or a multi-purpose controller of the gas turbine system 10. Additionally, or in the alternative, the controller 48 may be removably coupled to the bearing system 42. For example, the controller 48 may be coupled to the bearing system 42, as shown in FIG. 1, during an inspection or maintenance period when the controller 48 may download logged data from a memory of the bearing system 42.

The controller 48 may include one or more processors 50 and a memory 52. The one or more processors 50 may be operatively coupled to the memory 52 to execute instructions for carrying out the presently disclosed techniques. These instructions may be encoded in programs or code stored in a tangible non-transitory computer-readable medium, such as the memory 52 and/or other storage. The processor 50 may be a general purpose processor (e.g., processor of a desktop/laptop computer), system-on-chip (SoC) device, or application-specific integrated circuit, or some other processor configuration. The memory 52, in the embodiment, includes a computer readable medium, such as, without limitation, a hard disk drive, a solid state drive, diskette, flash drive, a compact disc, a digital video disc, random access memory (RAM), and/or any suitable storage device that enables the processor 50 to store, retrieve, and/or execute instructions and/or data. The memory 52 may include one or more local and/or remote storage devices.

The controller 48 is coupled to components of the gas turbine system 10 via a plurality of data lines 54, shown as dashed lines in FIG. 1. Each data line 54 may transmit data signals between the controller 48 and components of the gas turbine system 10. For example, one or more sensors 56 throughout the gas turbine system 10 may communicate sensor data with the controller 48 via one or more respective data lines 54. The sensors 56 may provide feedback to the controller 48 regarding various properties (e.g., operating parameters) of the gas turbine system 10 including, but not limited to, temperature (e.g., lubricant temperature, gas temperature, ambient temperature, exhaust temperature, component operating temperature), pressure (e.g., ambient pressure, fuel pressure, compressor discharge pressure, exhaust pressure, lubricant pressure), composition (e.g., lubricant composition, air intake composition, fuel mixture composition, exhaust gas composition), load on the turbine 18, load (e.g., thrust, torque) on the shaft 28, fluid levels (e.g., fuel 14, lubricant reservoir 44), or any combination thereof. That is, the controller 48 may store (via the memory 52) data corresponding to operation of the gas turbine system 10 for concurrent or later retrieval (e.g., download). Additionally, or in the alternative, the controller 48 may communicate control signals to components (e.g., pump 46, intake 24, compressor 22, fuel nozzle 12) via the one or more respective data lines 54 of the gas turbine system 10.

The controller 48 may be coupled to a network 58 via a wired or wireless connection. In some embodiments, the controller 48 receives instructions or other data to store in the memory 52 from the network 58. Additionally, the controller 48 may transmit data (e.g., control history, sensor feedback) to the network 58. The controller 48 may communicate with the network 58 continuously, at regular or scheduled intervals when the controller 48 is coupled to the network 58, on-demand at the command of an operator of the gas turbine system 10 or the network 58, or any combination thereof. The network 58 may store the data from the controller 48 for later access (e.g., backup, review). In some embodiments, the network 58 may utilize the data from the controller 48 to construct or modify a model of the performance of the gas turbine system 10. Additionally, or in the alternative, the network may utilize the data from the controller 48 with data from controllers 48 of other gas turbine systems 10 to construct or modify such a model. A computer 60 coupled to the network 58 may facilitate communication between the controllers 48 of multiple gas turbine systems 10 of a fleet of gas turbine systems 10. Moreover, a computer 60 may transmit data (e.g., instructions, models, thresholds, system updates) to the controllers 48 of multiple gas turbine systems 10, and the computer 60 may receive data from the controllers 48 via the network 58. In some embodiments, the remote computer 60 generates or modifies a model, and distributes the model to a plurality of controllers 48 via the network 58.

As described herein, sensor feedback from the gas turbine system 10 (or other turbomachinery) may be utilized to monitor the condition of the one or more bearings 40. The controller 48, the network 58, one or more computers 60 coupled to the network 58, or any combination thereof, may utilize sensor feedback to monitor the condition of the one or more bearings 40. As discussed herein, a term analytical engine system 64 is understood to refer to the controller 48, the network 58, one or more computers 60, or any combination thereof. It is believed that the temperature of the lubricant 38 and the load (e.g., axial and/or radial) on the bearing 40 during operation may be used to identify the occurrence of a condition (e.g., anomalies, wear) on the bearing 40, thereby enabling the maintenance or replacement of the bearing 40 at a cost-effective time that may reduce downtime of the gas turbine system 10 while preserving the operational integrity of the gas turbine system 10. Operating history and feedback from other sensors 56 may also be used to determine the condition of the bearing 40. The controller 48 may monitor the sensor feedback from the gas turbine system 10 through comparison of the sensor feedback to one or more models stored in memory 52 or on the network 58. Likewise, the network 58, one or more computers 60 coupled to the network 58, or any combination thereof, may monitor the sensor feedback from the gas turbine system 10 through comparison of the sensor feedback to one or more models stored in memory 52 or on the network 58.

The one or more models described herein may be constructed for and utilized for a specific gas turbine system. That is, each gas turbine system of a fleet of multiple gas turbine systems may construct and update (i.e., modify) one or more respective models specifically to monitor the respective gas turbine system. Accordingly, the one or more models utilized by a first gas turbine system of the fleet of gas turbine systems may be different from the one or more models utilized by a second gas turbine system of the fleet of gas turbine systems. Therefore, while each model may be constructed, modified, and implemented as described below, the data utilized by the model for comparison to acquired data may be unique to each gas turbine system. Additionally, it may be appreciated that some data utilized to construct, update, and implement the one or more models of a gas turbine system may be utilized by multiple analytical engine systems 64 across a fleet of gas turbine systems. For example, one or more of a threshold percentage (T), a temperature anomaly threshold ($p_1$), and a thrust anomaly threshold ($p_2$) may be shared and utilized by multiple analytical engine systems 64 to separately monitor multiple gas turbine systems 10.

Figure 2:
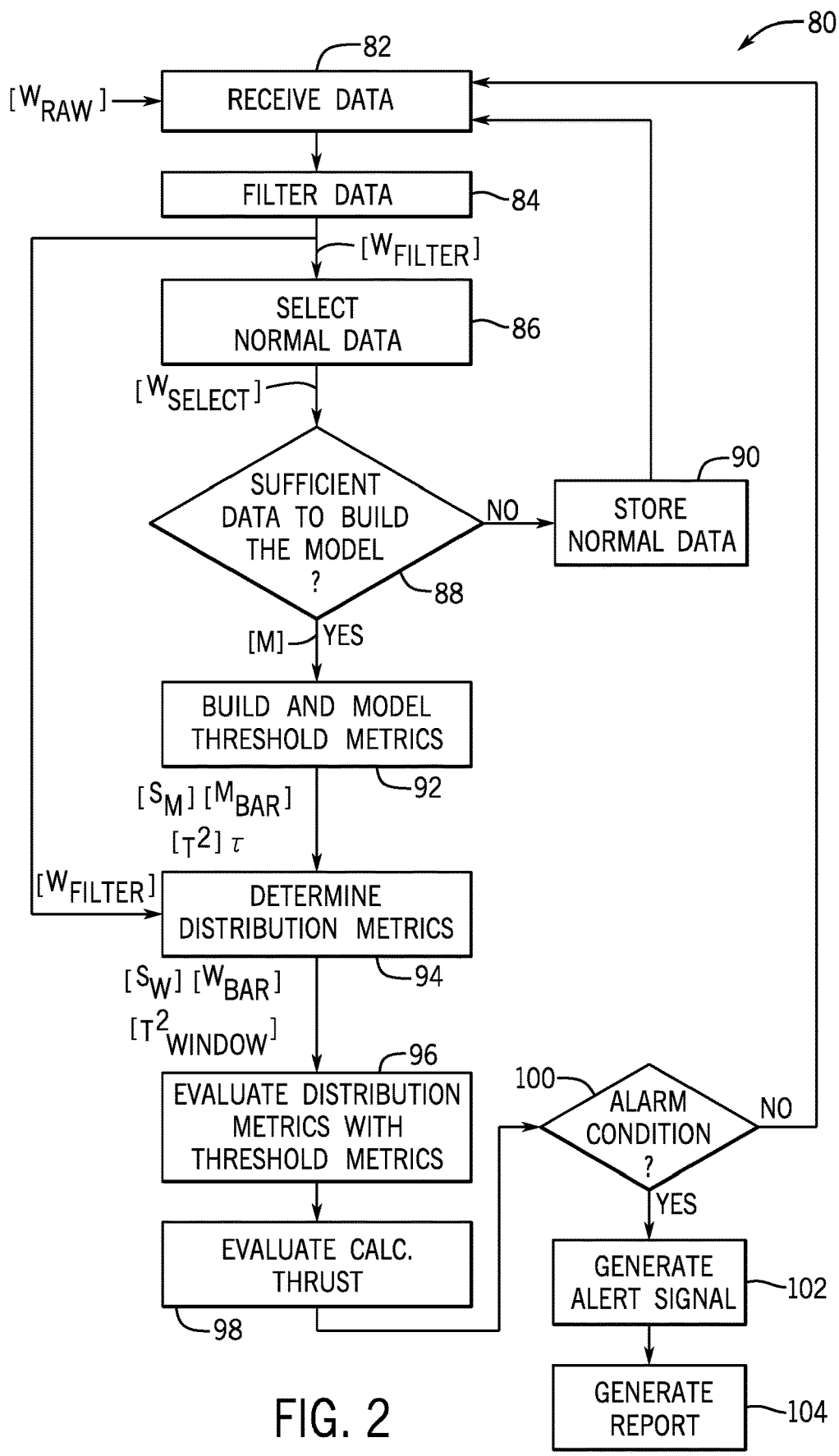
FIG. 2 is an embodiment of a method for constructing and updating a model used to monitor the condition a bearing of the turbomachinery system.

FIG. 2 illustrates a method 80 of the construction (e.g., building, generation), modification, and implementation of a model to monitor the condition of the one or more bearings 40 of the gas turbine system 10. To construct or modify the model, the analytical engine system 64 receives (block 82) data. As discussed herein, the initial data received by the analytical engine system 64 is referred to as window data [$W_{raw}$] over a sample window. As discussed below, elements of the window data may be sampled at regular intervals (e.g., one second, one minute, five minutes) during operation of the engine system. In some embodiments, the method 80 may be executed by a computer (e.g., controller 48) directly coupled to one or more gas turbine systems 10, or to a computer (e.g., network 58, computer 60 coupled to the controller 48 via the network 58) that is remote from and uncoupled to a gas turbine system 10. That is, the computer may receive (block 82) the data for construction or modification of the model directly from a turbomachinery system, or from a data input (e.g., network, memory device, manual input).

The received window data [$W_{raw}$] may include, but is not limited to, sensor feedback, system parameters, system identification information, operational hi story, maintenance history, inspection data, or any combination thereof. For example, the sensor feedback may include one or more of the following: a temperature of the lubricant 38 in the bearing 40, a temperature of the lubricant 38 in the pump 46, a temperature of the lubricant 38 in the one or more reservoirs 44 (e.g., sumps), a level of the lubricant 38 in the one or more reservoirs 44, a discharge pressure of the compressor 22 (e.g., high pressure compressor), a pressure of the exhaust gas 36, a temperature of the exhaust gas 36, a shaft speed, an ambient environment temperature, an ambient environment pressure, and a humidity of the ambient environment. The system parameters may include a power output of the load 26, a calculated thrust load on one or more bearings 40, or any combination thereof. The system identification information may include, but is not limited to, a model number, a serial number, an installation site for the turbomachinery (e.g., gas turbine system 10), and so forth. The operational history may include, but is not limited to, duration of operation, duration at base loading, duration at peak loading, duration at idle, and startup/shutdown cycles. The maintenance history may include, but is not limited to, date(s) of last service, scheduled maintenance completed, and maintenance technician identity. The inspection data may include, but is not limited to, the condition of the one or more bearings as determined from a previous inspection or maintenance service. It may be appreciated that the analytical engine system 64 (e.g., controller 48, network 58, computer 60) may receive (block 82) window data for the model from one or more turbomachines, such as a fleet of gas turbine systems 10 distributed regionally or globally.

The window data [$W_{raw}$] may include data sets for multiple fields sampled over an interval (e.g., one second, one minute, one hour, two hours, four hours, or more). For example, the window data [$W_{raw}$] may be sampled every minute for an interval of four hours, such that the window data includes at least 240 data sets. In some embodiments, each data set (e.g., vector) of the window data includes a pressure sensor feedback, one or more temperature sensor feedbacks, a power feedback, and a bearing load. For example, each data set of the window data may include data for six fields: a high pressure compressor discharge pressure (P), two lubricant sump temperatures ($T_{sump1}$, $T_{sump2}$), a lubricant supply temperature ($T_{supply}$), a power output (L), and a calculated bearing thrust load (B). In some embodiments, the length (i.e., quantity of elements) of one or more fields of the window data is different than the length of other fields. For example, the length of the power output (L) field may be greater than the length of the temperature fields ($T_{sump1}$, $T_{sump2}$, $T_{supply}$).

The analytical engine system 64 (e.g., controller 48, network 58, computer 60) filters (block 84) the received window data based on what is determined to be invalid data for modeling. In some embodiments, the analytical engine system 64 may filter out, or remove from further consideration, received data that does not correspond to a steady state operation of the turbomachine based at least in part on the lubricant temperature. For example, the lubricant temperature may be much lower at a start-up of the turbomachinery than during a steady state operation. Additionally, or in the alternative, the lubricant temperature may change based at least in part on a load on the turbomachinery or a rotational speed of the turbomachinery. Accordingly, the analytical engine system 64 may filter (block 84) the received window data so that the data used for the construction of the model, the modification of the model, or comparison with the model does not include the received window data that corresponds to an operation interval where the lubricant temperature is changing. That is, data from steady state operation may better facilitate modeling and comparison than data from dynamic operating periods. In some embodiments, the received window data sets may be removed (e.g., filtered) from further consideration when the lubricant temperature changes more than 1, 2, 3, 4, 5, 10, or more degrees Celsius over an operation interval. Additionally, or in the alternative, the received window data sets corresponding to samples after the power output (L) has changed more than a predetermined load fluctuation over the operational interval. In some embodiments, the operation interval is approximately 5, 10, 15, 30, 60, or more minutes. For example, the analytical engine system 64 may filter from the window data all the data sets within 60 minutes of a load fluctuation greater than 10 MW.

Additionally, or in the alternative, the analytical engine system 64 filters (block 84) the received window data [$W_{raw}$] based on the pressure feedback of a sample. For example, the analytical engine system 64 may filter from the window data all the data sets corresponding to samples in which the high pressure compressor discharge pressure (P) is less than or equal to 3447 kPa (500 psi). Removal of some data sets from the window data [$W_{raw}$] forms filtered window data [$W_{filter}$].

When the analytical engine system 64 (e.g., controller 48, network 58, computer 60) is constructing or modifying the model, the analytical engine system 64 may select (block 86) a subset of the filtered window data [$W_{filter}$] for the construction or modification of the model. The subset [$W_{select}$] of the filtered window data may be selected because it represents normal operation of the turbomachinery within design conditions. Criteria for selection of the subset [$W_{select}$] from the filtered window data [$W_{filter}$] may include, but is not limited to whether a load is engaged with the turbomachinery, a quantity (e.g., measured quantity, calculated quantity) of the load on the turbomachinery, a compressor discharge pressure, or any combination thereof. For example, the criteria for selection of the subset [$W_{select}$] from the filtered window data [$W_{filter}$] may be data corresponding to samples when the calculated bearing thrust load (B) is within a predetermined normal operating range for the bearing. The filtered window data [$W_{filter}$] is further processed to select the subset [$W_{select}$] to avoid the inclusion of anomalous data in the model.

In some embodiments, the window data [$W_{raw}$] may include samples taken every minute over a window interval of four hours, resulting in a window data [$W_{raw}$] with 240 data sets. It may be appreciated that other sample frequencies (e.g., once per 60, 120, 300, 600 seconds) and window intervals (e.g., 0.25, 0.5, 1, 2, 3, 4, 5, 8, 12, or 24 hours) may be utilized. It may be desirable for the model [M] to have a length N that is a multiple of the length of the window data [$W_{raw}$], where the multiple may be 2, 3, 4, 5, 6, 7, 8, 9, 10, or more. For example, where the window data [$W_{raw}$] has 240 data sets, the model [M] may have 1200 data sets, corresponding to approximately 20 hours of samples taken at a rate of one sample per minute. The length N (e.g., quantity of data sets) of the model [M] may be predetermined for the specific gas turbine system 10, or may be predetermined for the fleet of gas turbine systems 10. The analytical engine system 64 determines (node 88) whether the model [M] has sufficient data (e.g., sufficient length) to construct the model. The analytical engine system 64 may store (block 90) some or all of the data sets of the subset [$W_{select}$] in memory and return to block 82 to receive more data to build the model [M] if the model [M] has less than the length N. For example, the analytical engine system 64 may append to the model [M] (with 500 data sets) some or all of the data sets of the subset [$W_{select}$] from the filtered window data [$W_{filter}$] until the model [M] has 1200 total data sets. In some embodiments, older data sets of the model [M] may be replaced by newer data sets from the subset [$W_{select}$], thereby updating the model with more recently acquired data without increasing the length of the model [M].

When the model [M] has sufficient data sets, the analytical engine system 64 (e.g., controller 48, network 58, computer 60) builds (block 92) the model [M] and threshold metrics. The analytical engine system 64 may determine a vector [Mbar] of the means for one or more of the fields of the model [M]. For example, the analytical engine system 64 may determine from the model [M] a 1×4 vector of the means of each lubricant sump temperature ($T_{sump1}$, $T_{sump2}$), a mean lubricant supply temperature ($T_{supply}$), and a mean bearing load (B). The analytical engine system 64 may also determine a covariance matrix [$S_M$] for the model data. For example, the analytical engine system 64 may determine from the model [M] (N×4 matrix) and the vector [Mbar] of the means (1×4 vector) a covariance matrix [$S_M$] that is a 4×4 matrix. Utilizing the model [M] and the threshold metrics (e.g., the covariance matrix [$S_M$], and the vector [Mbar] of the means), the analytical engine system 64 may determine a probability distribution model of distances, such as a Hotelling's $T^2$ statistic or a Runger $U^2$ statistic. It may be appreciated that the probability distribution model includes a metric (e.g., distance) that corresponds to each data set of the model [M]. For example, a Hotelling's $T^2$ distance for each data set of the model [M] forms a N×1 probability distribution vector [$T^2$]. In some embodiments, the threshold metrics may be based at least in part on different types of data, such as one or more temperature measurements and one or more loads, such as a calculated bearing thrust load (B). A small distance metric corresponds to a relatively high degree of confidence of a normal condition (e.g., lubricant temperature, bearing thrust), and a large distance metric corresponds to a relatively low degree of confidence of the normal condition, or an anomalous condition.

A threshold for anomalous behavior of the gas turbine system may be determined from the probability distribution model. A threshold percentage ($\tau$) for anomaly detection may be obtained by determining a percentile from the probability distribution of values of $[T^2]$ of the model. The percentile may be determined based at least in part on an analysis of regular operating characteristics of the fleet of gas turbine systems. For example, analysis of the fleet may identify that under normal operating conditions corresponding to no thrust bearing anomalies or lubricant temperature anomalies, 90 percent of the $T^2$ distances are less than a threshold value ($T^2_{threshold}$). In that example, the threshold percentage ($\tau$) is 90 percent. The threshold percentage ($\tau$) may be set to different values based on analysis of the fleet. Moreover, it is expected that while the threshold percentage ($\tau$) for each gas turbine system of the fleet may be the same (e.g., 90 percent), the threshold value ($T^2_{threshold}$) may vary among gas turbine systems of the fleet due to at least differences in the model data for each respective gas turbine system. As discussed herein the probability distribution model based on the model [M], the threshold percentage ($\tau$), and the threshold value ($T^2_{threshold}$) are threshold metrics.

The analytical engine system 64 also determines (block 94) distribution metrics, such as a probability distribution vector $[T^2_{window}]$ of distances, from the filtered subset $[W_{filter}]$ of the window data $[W_{raw}]$. The determined distribution metrics may be utilized for comparison with the model [M] and the threshold metrics to determine whether the filtered subset $[W_{filter}]$ of the window data $[W_{raw}]$ is identified with a lubricant temperature alert. Accordingly, the analytical engine system 64 may determine a vector $[W_{bar}]$ of the means and a covariance matrix $[S_W]$ from the filtered subset $[W_{filter}]$. The $T^2$ distance values of the probability distribution vector $[T^2_{window}]$ are compared to the threshold value ($T^2_{threshold}$) from the model [M]. That is, each data point of the probability distribution vector $[T^2_{window}]$ is evaluated to determine whether the respective $T^2$ distance is greater than the threshold value ($T^2_{threshold}$) from the model data. If any $T^2$ distance is greater than the threshold value ($T^2_{threshold}$) from the model data, then that $T^2$ distance corresponds to a data point identified as anomalous. Accordingly, each $T^2$ distance value of the probability distribution vector $[T^2_{window}]$ is identified as either normal or anomalous.

Figure 3:
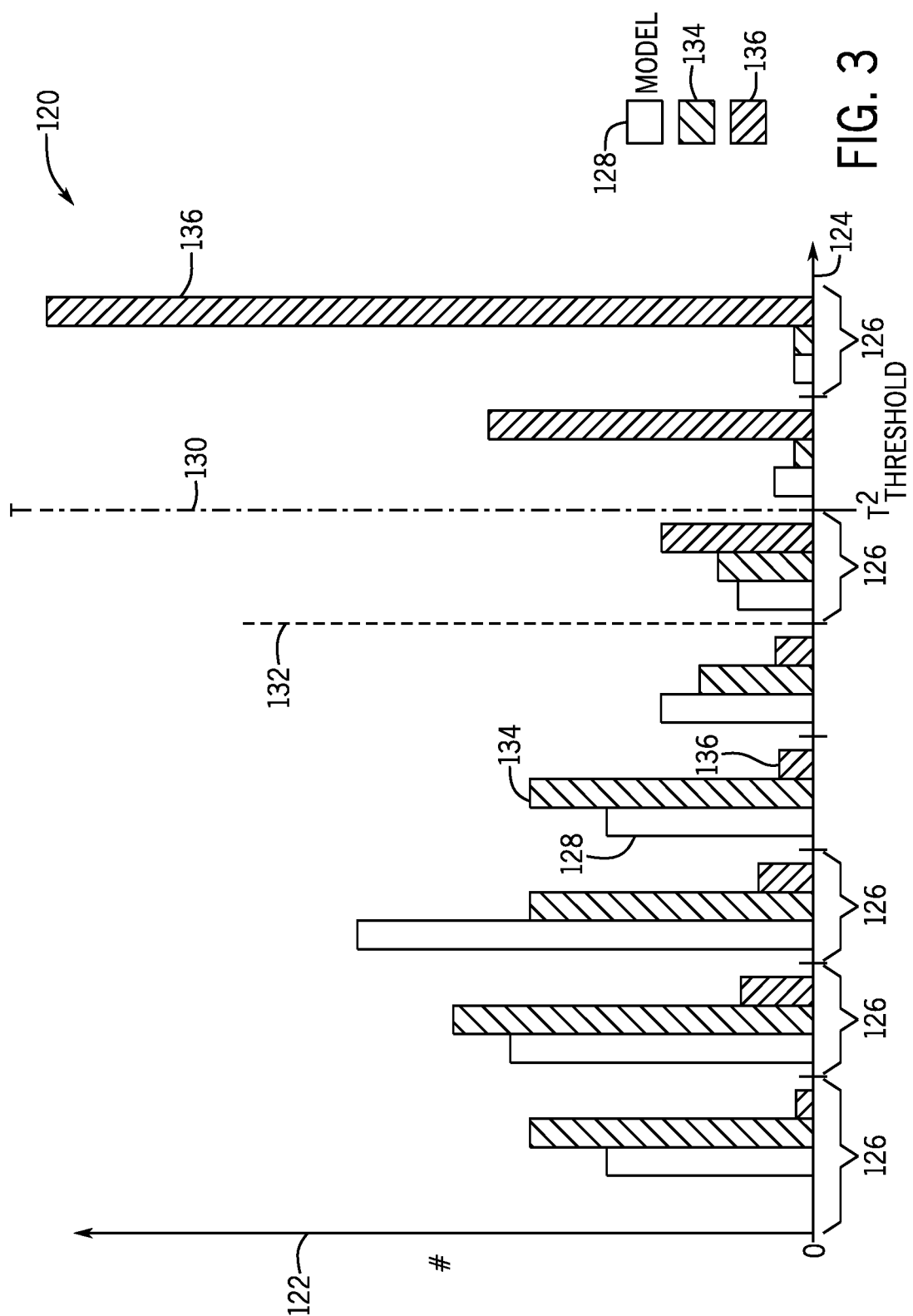
FIG. 3 is a histogram illustrating an embodiment of a comparison of metrics from data windows with the model used to monitor the condition of the bearing of the turbomachinery system.

FIG. 3 is a histogram 120 that illustrates a comparison of a probability distribution vector of window data to a probability distribution vector of a model. The y-axis 122 represents occurrences, and the x-axis 124 represents bins 126 or ranges of $T^2$ distances with increasing values to the right. A threshold percentage ($\tau$) 130 of the $T^2$ distances of the model probability distribution vector 128 are less than the threshold value ($T^2_{threshold}$). For example, FIG. 3 illustrates that for a first threshold percentage ($\tau$) 130 of 95 percent, 95 percent or more of the $T^2$ distances of the model probability distribution vector 128 are to the left of (i.e., less than the) first threshold percentage ($\tau$) 130. As discussed above, the threshold percentage ($\tau$) may be modified, such that the threshold value of the probability vector of the model is also modified. For example, FIG. 3 illustrates that for a second threshold percentage ($\tau$) 132 of 90 percent, 90 percent or more of the $T^2$ distances of the model probability distribution vector 128 are to the left of the second threshold percentage ($\tau$) 132.

As described above, each data point of the probability distribution vector $[T^2_{window}]$ of a window is evaluated relative to the model data to determine whether the $T^2$ distance is greater than the threshold value ($T^2_{threshold}$) from the model data. FIG. 3 illustrates this evaluation with a first probability distribution vector 134 of a first window. Although the distribution of the $T^2$ distances for the first probability distribution vector 134 is different than the $T^2$ distances for the model probability distribution vector 128, it may be appreciated that the first probability distribution vector 134 also has 95 percent or more of the $T^2$ distances to the left of (i.e., less than the) first threshold percentage ($\tau$) 130. Accordingly, the analytical engine system 64 would evaluate the first probability distribution vector 134 of the filtered subset $[W_{filter}]$ of the window data $[W_{raw}]$ to correspond to normal operation of the gas turbine system.

In some embodiments, the analytical engine system 64 may identify the filtered subset $[W_{filtered}]$ of the window data $[W_{raw}]$ with a lubricant temperature alert when the fraction of data sets of the filtered subset $[W_{filter}]$ identified as anomalous is greater than a temperature anomaly threshold $p_1$. The temperature anomaly threshold $p_1$ may have a value between 0 and 1, such as 0.3, 0.4, 0.5, 0.6, or 0.7. It is believed that a value of 0.5 for the temperature anomaly threshold $p_1$ provides a desirable balance between false alarm indications and accurate detection of anomalous bearing events. Because the first probability distribution vector 134 has 95 percent or more of its $T^2$ distances less than the threshold percentage $T^2_{threshold}$, the fraction of data sets of the first probability distribution vector 134 identified as anomalous is 5 percent (0.05) or less. It may be noted that the approximately 5 percent of the $T^2$ distances of the model probability distribution vector 128 and the first probability distribution vector 134 that are greater than the first threshold percentage 130 may be ignored as measurement error or noise without attribution to an anomalous lubricant temperature or bearing load of the gas turbine system.

FIG. 3 illustrates an evaluation of a second probability distribution vector 136 of a second window, which would be identified with a lubricant temperature alert when evaluated with the threshold value ($T^2_{threshold}$) from the model data and the temperature anomaly threshold. In contrast to the first probability distribution vector 134, many of the $T^2$ distances of the second probability distribution vector 136 are shown to be greater than the first threshold percentage 130. Indeed, the analytical engine system 64 may identify that the fraction of the $T^2$ distances of the second probability distribution vector 136 greater than the $T^2_{threshold}$ is greater than the temperature anomaly threshold $p_1$ (e.g., 0.5).

Returning to FIG. 2, the analytical engine system 64 may evaluate (block 96) the probability distribution vector (e.g., $[T^2_{window}]$) from the filtered subset $[W_{filter}]$ of the window data $[W_{raw}]$ with the threshold percentage ($\tau$) of the model probability distribution, the threshold value ($T^2_{threshold}$), and the temperature anomaly threshold $p_1$. Where the fraction is greater than the temperature anomaly threshold $p_1$, the analytical engine system 64 identifies the filtered subset $[W_{filter}]$ with a lubricant temperature alert. Where the fraction of the values of the probability distribution vector from the filtered subset $[W_{filter}]$ greater than the threshold value is less than the temperature anomaly threshold $p_1$, the analytical engine system 64 identifies the filtered subset $[W_{filter}]$ of the window data $[W_{raw}]$ as normal operating conditions. With reference again to FIG. 3, window data corresponding to the second probability distribution vector 136 would be identified by the analytical engine system 64 with a lubricant temperature alert, whereas window data corresponding to the first probability distribution vector 134 would be identified as normal operating conditions. Moreover, in some embodiments, the window data corresponding to normal operating conditions may be utilized to further update the model for analysis of subsequently acquired window data.

The analytical engine system 64 may also evaluate (block 98) the calculated bearing thrust load (B) of the filtered subset [$W_{filter}$] of the window data [$W_{window}$] to determine whether the feedback on the bearing thrust alone is anomalous independent of the lubricant temperature evaluation of block 96. The analytical engine system 64 may compare each calculated bearing thrust load (B) of the filtered subset [$W_{filter}$] to a threshold thrust range. Each data point with a calculated bearing thrust load outside of the threshold thrust range may be identified with an anomalous thrust value. Accordingly, each data point of the filtered subset [$W_{filter}$] is identified as having either a normal thrust value or anomalous thrust value. If a fraction of the data points of the filtered subset [$W_{filter}$] identified with anomalous thrust values is greater than a thrust anomaly threshold $p_2$, then the analytical engine system 64 may identify the whole filtered subset [$W_{filter}$] of the window data [$W_{raw}$] with a thrust alert. The thrust anomaly threshold $p_2$ may have a value between 0 and 1, such as 0.3, 0.4, 0.5, 0.6, or 0.7. It is believed that a value of 0.5 for the thrust anomaly threshold $p_2$ provides a desirable balance between false alarm indications and accurate detection of anomalous bearing events.

In some embodiments, the load on the bearing 40 may be calculated based at least in part on one or more pressures in the turbine 18 (e.g., forward cavity, bleed path cavity) of the gas turbine system 10, a load on the blades of the compressor 22 and the blades of the turbine 18, and a strain on a flexible coupling of the gas turbine system 10. It may be appreciated that the forward cavity may be a chamber within the turbine near one of the bearings 40 proximate the turbine, and the bleed path cavity may be a chamber within the turbine near one of the bearings 40 that receives a compressor bleed flow.

The analytical engine system 64 may set the threshold percentage ($\tau$), the temperature anomaly threshold $p_1$, and the thrust anomaly model threshold $p_2$ based on a determined balance between acceptable false alarm rate (e.g., less than 10, 9, 8, 7, 6, 5, 4, 3, 2, or 1 percent) and minimum coverage (e.g., greater than 80, 85, 90, or 95 percent detection). For example, the analytical engine system 64 may set the threshold percentage ($\tau$), the temperature anomaly threshold $p_1$, and the thrust anomaly model threshold $p_2$ to provide a 7 percent or less false alarm rate and a 91 percent detection rate of anomalous bearing conditions.

The analytical engine system 64 determines (node 100) whether there is one or both of a lubricant temperature alert from the evaluation of block 96 or a thrust alert from the evaluation of block 98. Where there is no alert corresponding to the filtered subset [$W_{filter}$] of the window data [$W_{raw}$], then the analytical engine system 64 returns to block 82 to receive the next window data set. If the filtered subset [$W_{filter}$] of the window data [$W_{raw}$] is determined to have an alert, then the analytical engine system 64 may generate (block 102) an alert signal. The alert signal may be an audible signal, a visual signal, a haptic signal, an electronic signal transmitted to an electronic device (e.g., display, controller, network device), or any combination thereof. In some embodiments, the analytical engine system 64 generates (block 102) the alert signal for an operator to observe. Additionally, or in the alternative, the analytical engine system 64 generates (block 102) the alert signal to be stored in a memory with the filtered data for a later review. For example, the controller 48 may generate an alert signal, which is later observed or communicated with the network 58 and/or a computer 60 when the data from the controller 48 memory 52 is reviewed by the network 58 or computer 60. In some embodiments, an alert may expire after an elapsed time period if the conditions for the alert are not observed again during the elapsed time.

The method 80 described above may be used to monitor lubricant temperature and bearing load parameters of the gas turbine system 10. The monitored lubricant temperature may include at least one of a bearing lubricant temperature in the lubricated bearing 40, a supply lubricant temperature in the pump 46, and a return lubricant temperature in the reservoir 44 (e.g., sump). Therefore, the models and threshold metrics described above may be used to generate an alert in response to an abnormality of one or more monitored lubricant temperatures.

The monitored lubricant temperature may be used together with the monitored load on the bearing 40 to determine the operational condition of the bearing 40. It is believed that monitoring of the load on the bearing 40 independent from, and in addition to monitoring the lubricant temperature, may improve diagnostics of the operational condition of the bearing 40 relative to monitoring only the load on the bearing 40 or only the lubricant temperature. For example, an anomalous load alert may be due to an anomalous condition of the bearing 40, instrumentation issues, or an improper setup/calibration, and an anomalous lubricant temperature alert may be due to an anomalous condition of the bearing, a lubricant temperature sensor issue, or an insufficient model. Analysis of the load alert and the lubricant temperature alert together as described herein may enable improved diagnostics of the bearing 40 and gas turbine system 10.

The analytical engine system 64 (e.g., controller 48, computer 60) may monitor the condition of the bearing 40 and the gas turbine system 10 through assigning alarm codes to various combinations of the load alert and the lubricant temperature alert. The analytical engine system 64 may associate one of the following alarm codes with the operational condition of the gas turbine system 10 during a monitoring period. In some embodiments, the analytical engine system 64 may continuously determine whether the load alert or the lubricant temperature alert have been generated. Additionally, or in the alternative, the analytical engine system 64 may periodically determine whether the load alert or the lubricant temperature alert have been generated. For example, the analytical engine system 64 may periodically monitor the load alert and the lubricant temperature alert at intervals of approximately 5, 10, 15, 30, 45, 60, 120, 240 or more minutes. Furthermore, in some embodiments, an alert or an alarm code may latch, such that an alarm code for a condition other than normal may only be assigned once per latch interval (e.g., 8, 12, 24 hours or more). Table 1 below lists an embodiment of the alarm codes (e.g., 0, 1, 2, 3) that the analytical engine system 64 (e.g., controller 48, network 58, computer 60) may utilize:

TABLE 1

| Load Alert | Lubricant Temperature Alert | Alarm Code | Possible Reason for Alert | Proposed Prescription |
|---|---|---|---|---|
| No | No | 0 | No issue (normal condition). | No prescription. |
| No | Yes | 1 | Temperature sensor calibration; bearing issue without load alert; insufficient model | No immediate action, yet investigate if frequent occurrence |
| Yes | No | 2 | Issue with sensor input for load calculation; improper parameters for load calculation | Investigate non-bearing issue at or before next maintenance period |
| Yes | Yes | 3 | Issue with variable orifice position; thrust balance issue | Investigate immediately; shut down gas turbine system. |

As illustrated above, alarm code 0 corresponds to a normal condition of the gas turbine system 10. That is, neither the calculated load nor the lubricant temperature alerts have been generated. The analytical engine system 64 assigns the alarm code 1 in response to only a lubricant temperature alert without a load alert. Operation of the gas turbine system 10 may continue with the alarm code 1, as the lubricant temperature alert may have been generated for benign reasons that do not necessarily indicate a bearing issue. In particular, the alarm code 1 may correspond to an improperly positioned or calibrated temperature sensor or a normal operating condition for which the presently utilized model is insufficient. An operator may generally continue operation of the gas turbine system 10 with the alarm code 1; however, further investigation into the root cause of the lubricant temperature may be desired if operation with the alarm code 1 is a frequent occurrence (e.g., a majority of monitoring intervals, daily). The recurrence of alarm code 1 may provide sufficient cause for the operator to investigate and resolve the issue to reduce the occurrence of the alarm code 1. Moreover, such an investigation resulting from alarm code 1 may identify a bearing anomaly that may not otherwise be detected from the calculated load.

The analytical engine system 64 assigns the alarm code 2 in response to only a load alert without a lubricant temperature alert. Thus, the alarm code 2 may indicate that the bearing 40 is operating normally with normal conditions, yet an issue with the parameters or inputs for the calculated load may be generating the load alert. Accordingly, an operator may seek to investigate the non-bearing issue at or before next maintenance period to resolve the calculated load issue to reduce the occurrence of the alarm code 2.

The analytical engine system 64 assigns the alarm code 3 in response to both a load alert and a lubricant temperature alert. Thus, the alarm code 3 may indicate that abnormal operating condition of the bearing 40. As may be appreciated, an increased load on the bearing 40 may increase the friction on the bearing 40, thereby increasing the lubricant temperature. Accordingly, the alarm code 3 indicates that both the load and the lubricant temperature exceed predetermined thresholds to generate respective alerts. The alarm code 3 may be caused by an improper orifice setting to supply the lubricant to the bearing 40, wear on the bearing 40, or a leak in a flow through the gas turbine system 10. For at least the reason that the load alert and the lubricant temperature alert are based at least in part on design parameters of the bearing 40 and the gas turbine system 10, the operator may initiate or schedule a shutdown of the gas turbine system 10 in response to the alarm code 3. In some embodiments, the analytical engine system 64 (e.g., controller 48) may initiate the shutdown automatically in response to the alarm code 3; however, the analytical engine system 64 may initiate the shutdown after a notification delay (e.g., 1, 5, 10, 30, or 60 minutes).

It may be appreciated that the information presented above in Table 1 is presented as an example that is not necessarily an exhaustive list of potential alarm codes, possible reasons for alerts, or proposed prescriptions. The analytical engine system 64 (e.g., controller 48, network 58, computer 60) or an operator may utilize additional monitored data and/or operational history in addition to an alarm code to determine a possible reason and proposed prescription for a given alarm code.

The analytical engine system 64 may generate (block 104) a report (e.g., customer report). Generating the report may include transmitting the report to the customer or a responsible agent for the customer. The report may include, but is not limited to, an alarm code, a prescribed action by the customer to reduce future costs, a scheduled maintenance period, or any combination thereof. Additionally, or in the alternative, the report may be an audible signal, a visual signal, or any combination thereof.

Technical effects of the invention include the determination of a bearing operating condition using more than a calculated load on the bearing, which may be subject to instrumentation errors. Moreover, the validation of an alert related to the bearing based at least in part on independent measurements (e.g., calculated load, lubricant temperature) may increase the confidence of an alert. Increasing the confidence of an alert and reducing the quantity of false indications may reduce maintenance costs and downtime of a gas turbine system. Furthermore, the capability to modify and update models and thresholds utilized for the lubricant temperature alert while monitoring the bearing operating condition enable the capabilities and confidence of the monitoring system to improve over time. Models and thresholds may be implemented on a per asset basis, such that each asset of a fleet of assets may be monitored with a continuously updated model based on the operation of that respective asset.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A monitoring system, comprising:
an analytical engine system coupled to a plurality of sensors of an engine system, wherein the analytical engine system is configured to:
receive a lubricant temperature via at least one of the plurality of sensors;
determine a model probability distribution based on model data, wherein the model data comprises model temperature data and model load data;
determine a distance threshold value of the model probability distribution based at least in part on a threshold percentage;
determine a window probability distribution based on window data sampled from the engine system, wherein the window data comprises window temperature data having the lubricant temperature and window load data that is based at least in part on feedback from the plurality of sensors during operation of the engine system;
determine a fraction of the window probability distribution that is greater than the distance threshold value; and
generate a lubricant alert signal when the fraction is greater than a temperature anomaly threshold of between 0 and 1, wherein the temperature anomaly threshold is obtained based on a desired acceptable false alarm rate, wherein the analytical engine system is configured to update the model data based on the window data when the fraction is less than the temperature anomaly threshold, and wherein updating the model data comprises:
determining an updated model probability distribution based on the window data;
determining an updated distance threshold value of the updated model probability distribution based at least in part on the threshold percentage; and
replacing the model probability distribution with the updated model probability distribution and replacing the distance threshold value with the updated distance threshold value.
2. The monitoring system of claim 1, wherein the threshold percentage is greater than 90 percent.
3. The monitoring system of claim 1, wherein the temperature anomaly threshold is between 0.45 and 0.55 inclusive.
4. The monitoring system of claim 1, wherein a model length of the model data is 4 or more times a window length of the window data.
5. The monitoring system of claim 1, wherein the model probability distribution and the window probability distribution comprise a Hotelling's $T^2$ statistic or a Runger $U^2$ statistic.
6. The monitoring system of claim 1, wherein the analytical engine system is configured to filter the window data based at least in part on whether the window data corresponds to a steady state operation of the engine system, wherein steady state operation of the engine system is based at least in part on the window temperature data or the window load data, and the analytical engine system is configured to remove data sets from the window data that do not correspond to the steady state operation of the engine system.
7. The monitoring system of claim 1, wherein the model temperature data comprises first model lubricant sump temperature data, second model lubricant sump temperature data, and model lubricant supply temperature data, wherein the model load data comprises model bearing thrust load data, the window temperature data comprises first window lubricant sump temperature data, second window lubricant sump temperature data, and window lubricant supply temperature data, and the window load data comprises window bearing thrust load data.
8. The monitoring system of claim 1, wherein the analytical engine system is configured to:
determine a second fraction of the window load data that is outside of a threshold thrust range; and
generate a load alert signal when the second fraction is greater than a thrust anomaly threshold.
9. A method of operating an analytical engine system, comprising:
receiving a lubricant temperature via at least one of a plurality of sensors disposed on an engine system;
loading model data from a memory, wherein the model data is based at least in part on sensor feedback during prior operation of the engine system;
determining a model probability distribution based on the model data, wherein the model data comprises model lubricant temperature data and model load data;
determining a distance threshold value of the model probability distribution based at least in part on a threshold percentage;
determining a window probability distribution based on window data sampled during operation of the engine system, wherein the window data comprises window temperature data having the lubricant temperature and window load data that is based at least in part on feedback from the plurality of sensors during current operation of the engine system;
determining a fraction of the window probability distribution that is greater than the distance threshold value;
generating a lubricant alert signal when the fraction is greater than a temperature anomaly threshold of between 0 and 1, wherein the temperature anomaly threshold is obtained based on a desired acceptable false alarm rate, wherein the analytical engine system is configured to update the model data based on the window data when the fraction is less than the temperature anomaly threshold; and
updating the model data based on the window data when the fraction is less than the temperature anomaly threshold, wherein updating the model data comprises:
determining an updated model probability distribution based on the model data and the window data;
determining an updated distance threshold value of the updated model probability distribution based at least in part on the threshold percentage; and
replacing the model probability distribution with the updated model probability distribution and replacing the distance threshold value with the updated distance threshold value.
10. The method of claim 9, wherein the model probability distribution and the window probability distribution comprise a Hotelling's $T^2$ statistic or a Runger $U^2$ statistic.
11. The method of claim 9, comprising:
filtering the window data based at least in part on whether the window data corresponds to a steady state operation of the engine system, wherein steady state operation of the engine system is based at least in part on the window temperature data or the window load data; and removing data sets from the window data that do not correspond to the steady state operation of the engine system.

12. The method of claim 9, wherein the model temperature data comprises two or more model data sets based on temperature feedback during prior operation of the engine system, the model load data comprises model bearing thrust load data, the window temperature data comprises two or more window data sets based on temperature feedback during current operation of the engine system, and the window load data comprises window bearing thrust load data based on calculated bearing thrust load data during current operation of the engine system.

13. The method of claim 9, comprising:
determining a second fraction of the window load data that is outside of a threshold thrust range; and
generating a load alert signal when the second fraction is greater than a thrust anomaly threshold.

14. The method of claim 13, comprising:
assigning an alarm code to the window data based at least in part on the lubricant alert signal and the load alert signal; and
transmitting a report based at least in part on the alarm code.

15. A non-transitory computer readable medium comprising instructions configured to be executed by a processor of a control system, wherein the instructions comprise instructions configured to cause the processor to:
receive a lubricant temperature via at least one of a plurality of sensors disposed on an engine system
load model data from a memory, wherein the model data is based at least in part on sensor feedback during prior operation of the engine system;
determine a model probability distribution based on the model data, wherein the model data comprises model lubricant temperature data and model load data;
determine a distance threshold value of the model probability distribution based at least in part on a threshold percentage, wherein the threshold percentage is greater than or equal to 90 percent;
determine a window probability distribution based on window data sampled from the engine system, wherein the window data comprises window temperature data having the lubricant temperature and window load data that is based at least in part on sensor feedback during operation of the engine system;
determine a fraction of the window probability distribution that is greater than the distance threshold value;
generate a lubricant alert signal when the fraction is greater than a 0.5; and
remove data sets of the window data to form filtered window data, wherein the removed data sets do not correspond to a steady state operation of the engine system, wherein steady state operation of the engine system is based at least in part on the window temperature data or the window load data.

16. The non-transitory computer readable medium of claim 15, wherein the instructions comprise instructions to cause the processor to:
update the model data based on the filtered window data when the fraction is less than the 0.5, wherein updating the model data comprises:
determining an updated model probability distribution based on the model data and the filtered window data;
determining an updated distance threshold value of the updated model probability distribution based at least in part on the threshold percentage;
replacing the model probability distribution with the updated model probability distribution; and
replacing the distance threshold value with the updated distance threshold value.

17. The non-transitory computer readable medium of claim 15, wherein the model probability distribution and the window probability distribution comprise a Hotelling's $T^2$ statistic.

* * * * *